United States Patent [19]

Mizukami et al.

[11] Patent Number: 4,903,151

[45] Date of Patent: Feb. 20, 1990

[54] HEAD POSITIONING SYSTEM FOR POSITIONING A MULTIPLE HEAD WITH RESPECT TO DATA AND SERVO TRASKS OF A RECORDING MEDIUM

[75] Inventors: Makoto Mizukami; Akio Mitamura, both of Tokyo; Ryoichi Arai, Saitama; Yasunaga Mitsuya; Tetsuo Mikazuki, both of Tokyo, all of Japan

[73] Assignee: Nippon Telegraph and Telephone Corporation, Tokyo, Japan

[21] Appl. No.: 5,984

[22] Filed: Jan. 22, 1987

[30] Foreign Application Priority Data

Jan. 23, 1986 [JP] Japan .................. 61-12350

[51] Int. Cl.$^4$ ............ G11B 5/55; G11B 5/29; G11B 5/58
[52] U.S. Cl. ............... 360/78.01; 360/77.01; 360/121; 360/61
[58] Field of Search ............ 360/61–63, 360/75, 77, 78, 105–107, 109, 121, 77.01, 77.02, 77.07, 77.08, 77.11, 77.12–77.15, 78.01, 78.02, 78.04, 78.14, 78.15

[56] References Cited

U.S. PATENT DOCUMENTS

| | | | |
|---|---|---|---|
| 3,263,031 | 7/1966 | Welsh | 360/77 |
| 3,292,168 | 12/1966 | Gray | 360/78 |
| 3,769,465 | 10/1973 | Wellbrock | 360/77 |
| 4,149,198 | 4/1979 | Behr et al. | 360/77 |
| 4,152,736 | 5/1979 | Jansen et al. | 360/78 |

FOREIGN PATENT DOCUMENTS 54-135520  10/1979  Japan .................. 360/78

OTHER PUBLICATIONS

IBM TDB vol. 15, No. 4, "Servo Control of Multielement Magnetic Heads", Zimmerman et al., Sept., 1972, pp. 1320–1321.
IBM TDB vol. 17, No. 4, "Multielement Servo Head", McCormick, Sept., 1974, pp. 979–980.

Primary Examiner—Alan Faber
Assistant Examiner—Steven R. Garland
Attorney, Agent, or Firm—Armstrong, Nikaido Marmelstein Kubovcik & Murray

[57] ABSTRACT

A head positioning system on a recording medium includes a recording medium having a periodic arrangement of data tracks and servo tracks wherein the periodic arrangement having a predetermined period includes $N_d$ ($N_d$ is an integer equal to or larger than 1) number of data tracks and $N_s$ ($N_s$ is an integer equal to or larger than 2) number of servo tracks, the servo tracks having single phase servo patterns, alternatively recorded thereon, a multi-head carrying a plurality of head elements disposed in a direction perpendicular to the tracks, so that the distance between head elements is $(N_h+1/M)P$ where $N_h$ is an integer equal to or larger than O, M is an integer equal to or larger than 2, and P is a track pitch, wherein the multi-head is movable in a direction generally perpendicular to the direction of the tracks, means for selecting a servo head for reading servo tracks and a data head for reading data tracks from the head elements during a seek operation, wherein a selected servo head is selected to reproduce a servo pattern from a servo track and a selected data head is determined based on the selected servo head, and wherein the multi-head is positioned on a servo track in every 1/M track pitch of movement.

5 Claims, 12 Drawing Sheets

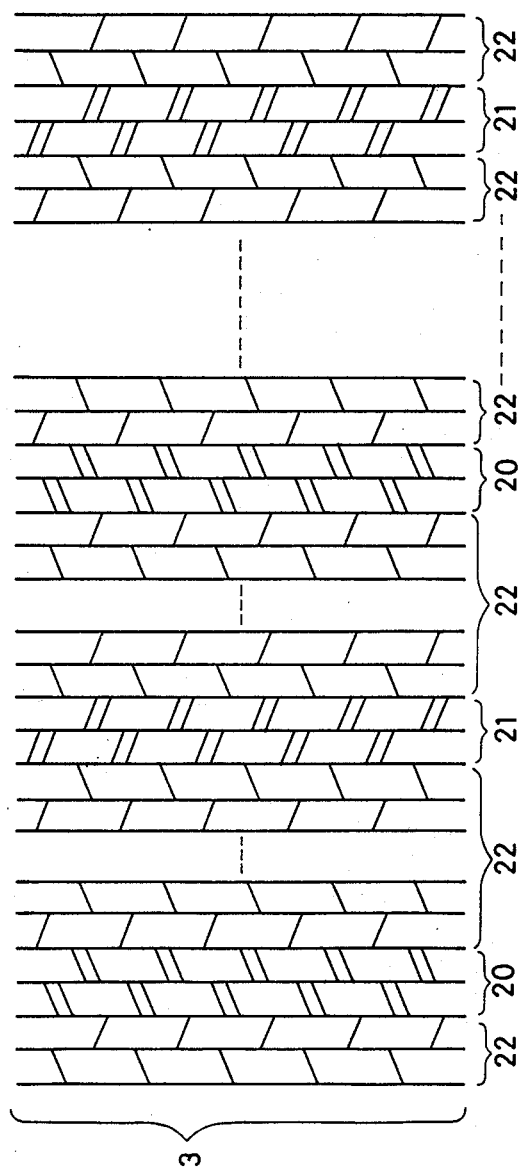

HEAD POSITIONING SYSTEM FOR POSITIONING A MULTIPLE HEAD WITH RESPECT TO DATA AND SERVO TRASKS OF A RECORDING MEDIUM

BACKGROUND OF THE INVENTION

The present invention relates to a head positioning system of a magnetic head on a magnetic recording medium. In particular, it relates to such a system which reads out a servo pattern embedded in a recording medium, and seeks and locates a head quickly according to said servo pattern.

The present invention is applicable not only to a magnetic recording system, but also to an optical recording system, although the embodiments in the present text are directed to a magnetic recording system.

In an accurate head positioning for a high density recording, a thermal off-track is a serious problem, which comes from temperature gradient in a device. A data surface servo system is a promising technique for solving the thermal off-track problem. Conventionally, two kinds of data surface servo systems have been proposed, they are; a sector servo system, and a continuous servo system (a track servo system).

A sector servo system records an information servo pattern at the beginning of a data track. In other words, each of the circular tracks has both a servo information and a data portion, so that a head reads servo information and data alternately. Therefore, the sector servo system has the disadvantage that it can only provide servo information intermittently, but it can not provide continuous servo information. Therefore, it is not suitable for a high speed seek, and/or an accurate positioning.

A track servo system has two kinds of tracks, a servo track and a data track. Those tracks are read out by using the specific heads, a servo head, and a data head. As the servo pattern is continuous, the high resolving power servo signal may be obtained. However, it has the disadvantage that when a head seeks a track (or a head moves in the radial direction) in traversing the tracks, the servo pattern is not continuous. Therefore, a prior track servo system is not suitable for a high speed seek system, although it can provide accurate positioning by a continuous servo pattern.

Some other prior art systems for solving the above disadvantages include a buried servo system, an optical servo system, and/or hybrid servo system which has an auxiliary specific servo plane. A buried servo system uses a two layer recording medium for data and servo information, and a head reads out both data and servo information, therefore, the resolving power of a reproduced servo pattern is not enough for highly accurate positioning. An optical servo system, and a hybrid servo system are complicated in structure, and have the disadvantage that the production cost is high.

SUMMARY OF THE INVENTION

It is an object, therefore, of the present invention to overcome the disadvantages and limitations of a prior head positioning system by providing a new and improved head positioning system.

It is also an object of the present invention to provide a continuous servo signal for high speed seek having accurate positioning and a simple structure.

According to one aspect of the present invention, the head positioning system comprises (a) a recording medium having a periodic arrangement with a predetermined period with $N_d$ ($N_d$ is an integer equal to or larger than 1) number of data tracks and $N_s$ ($N_s$ is an integer equal to or larger than 2) number of servo tracks which records single phase servo pattern, alternately, (b) a multi-head carrying a plurality of head elements in direction perpendicular to tracks so that the length or spacing between head elements is $(N_h + 1/M)P$ where $N_h$ is an integer equal to or larger than 0, M is an integer equal to or larger than 2, and P is a track pitch, and said multi-head moving relatively in a lateral direction of the tracks, (c) means for adaptively selecting a servo head for reading a servo pattern and a data head for reading data among said head elements during seek operation and following operation of the multi-head so that a servo head is selected to reproduce a servo pattern on a servo track and a data head is determined according to the selected servo head, and (d) the multi-head being positioned on a servo track in every 1/M track pitch of movement of the multi-head.

According to the other aspect of the present invention, the servo track is provided with M phases of servo pattern, and the spacing between head elements of the multi-head is $N_h$.

BRIEF DESCRIPTION OF THE DRAWINGS

The foregoing and other objects, features, and attendant advantages of the present invention will be appreciated as the same become better understood by means of the following description and accompanying drawings wherein;

FIG. 12 shows the third embodiment in which an azimuth track is used.

DESCRIPTION OF THE PREFERRED EMBODIMENTS

Figure 1:
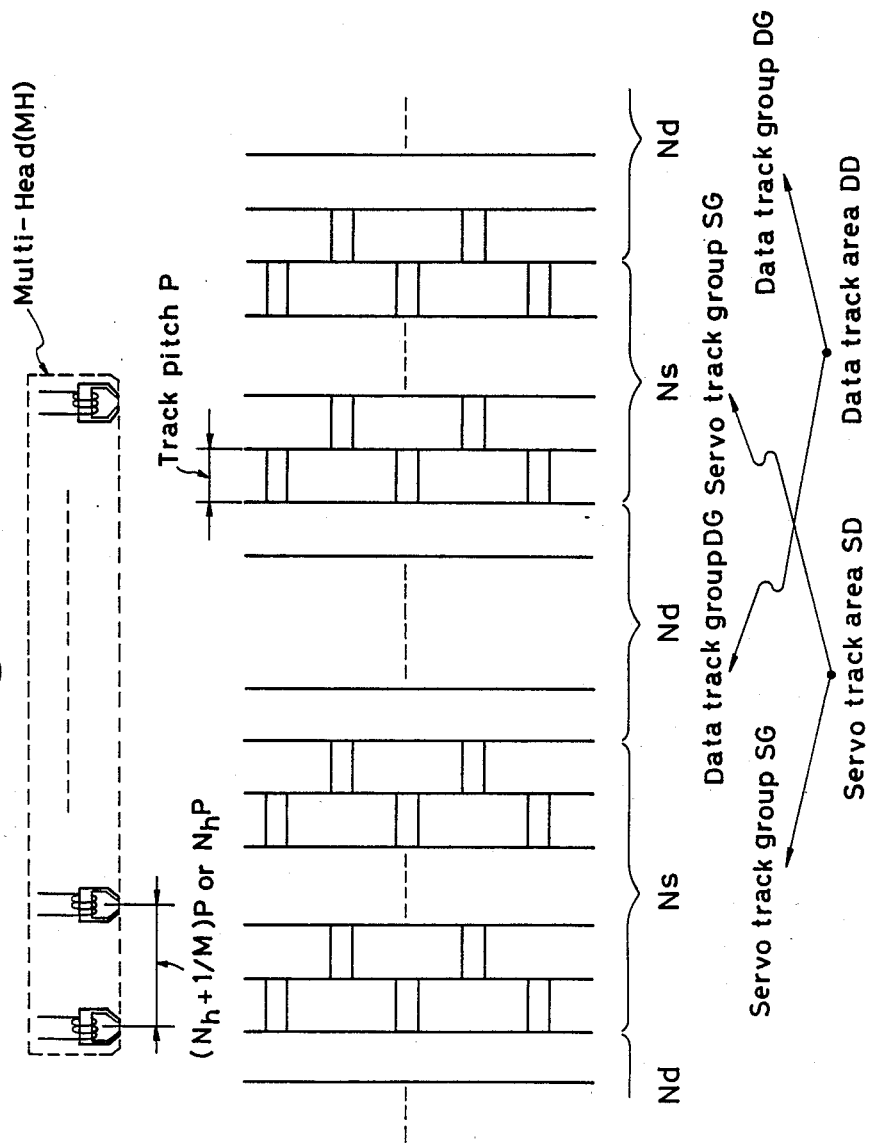
FIG. 1 shows the relations of a multi-head and tracks according to the present invention.

FIG. 1 shows a principle idea of the head positioning system according to the present invention. In the figure, $N_d$ ($N_d$ is an integer equal to or larger than 1) number of data tracks DG, and $N_s$ ($N_s$ is an integer equal to or larger than 2) number of servo tracks SG are provided alternately coplanar with one another on a recording medium, which is for instance a magnetic disk. The data recording on a data track area DD and a servo track area SD is read out by using a multi-track head MH which has a plurality of head elements.

Figure 2:
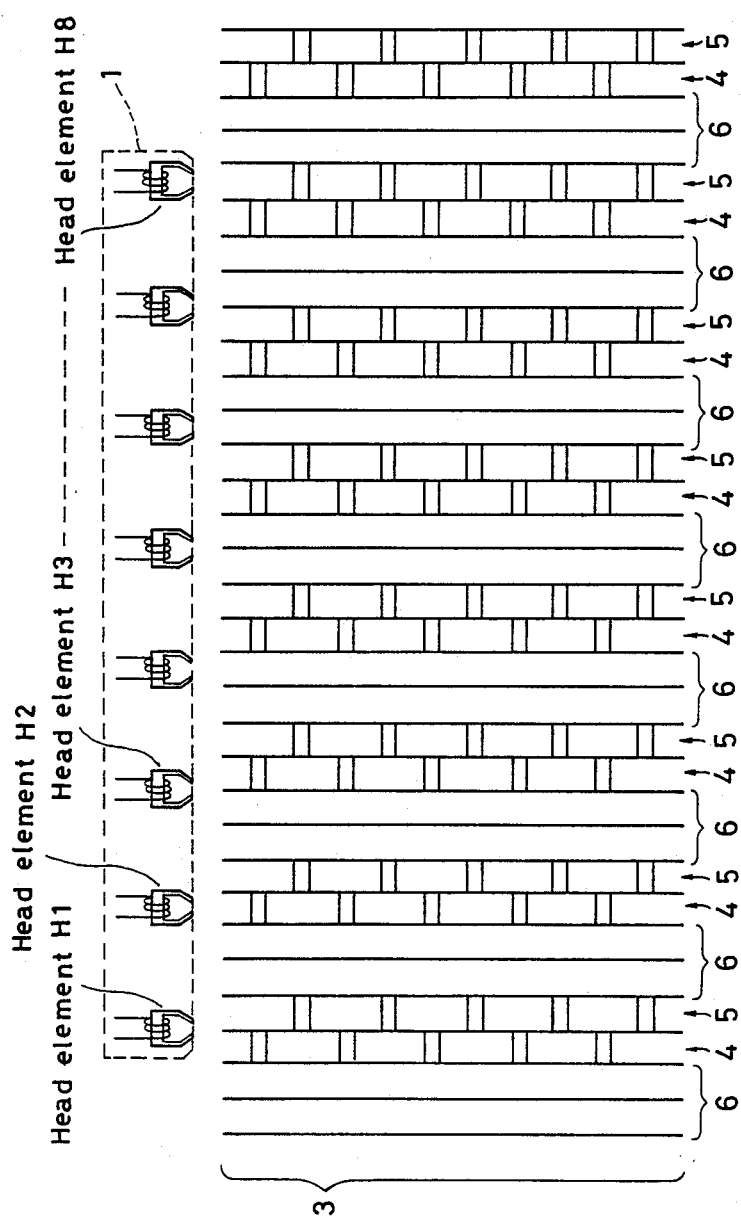
FIG. 2 shows the embodiment of a single phase servo system according to the present invention.

A servo pattern is written on a servo track with a predetermined period. FIGS. 1 and 2 are embodiment of a single phase servo pattern, but other embodiments with a plurality phases of servo pattern are possible as described later.

A multi-head MH has a plurality of head elements $H_l$ through $H_n$ in the lateral, or perpendicular direction of tracks. The length between adjacent head elements is $(N_h + 1/M)P$ where P is a track pitch (length between tracks), M is an integer equal to or larger than 2, and $N_h$ is an integer equal to or larger than zero. In that relation, at least M number of head elements are positioned on a track in the principle of a sliding caliper.

Therefore, one of the ON-track head elements positioned on a track is used as a servo head for positioning the multi-head MH, and other ON-track elements are used for writing/reading data. The servo head element provides continuous servo pattern during the whole revolution of the disk, and when the multi-head seeks the track by traversing tracks, the servo head element is switched to another element as the multi-head moves, and it should be noted that at least one element functions as a servo head at any time.

Now, the first embodiment which relates to a single phase servo system is described in detail in accordance with FIGS. 2 through 6. In those figures, the numeral 1 is a multi-head MH which has in the embodiment eight head elements H1 through H8. Those head elements are arranged on the line in the radius direction of a magnetic disk which is subject to write and/or read. The multi-head 1 faces a recording medium 3 (disk plane). The disk plane 3 is provided with a pair of servo tracks (ODD servo track 4 and EVEN servo track 5), and data tracks 6, alternately. A single phase servo pattern S is written in the servo tracks 4 and 5. The servo pattern S in the first servo track 4 and the servo pattern S on the second servo track 5 are written alternately as shown in the figure, in other words, the servo pattern on the tracks 4 and 5 have the phase difference of 180°. The length between each adjacent head elements is $(N_h + 1/M)P = 3.5P$, where P is a track pitch in the present embodiment. Other figures in the embodiment are; $N_s$ (number of servo tracks) is 2, $N_d$ (number of data tracks) is 2, $N_h$ (head duration constant) is 3, and M (phase number of servo signal) is 2.

Any head elements H1 through H8 can function as both a servo head and a data head. When a head element is located on a servo track, it functions as a servo head, and when it is located on a data track, it functions as a data head. In the embodiment of FIG. 2, the head element H1, which covers half of the servo track 4 and half of the servo track 5, operates as a servo head, and the head elements H4 and H6 which are ON condition on the data tracks 6 operate as a data head.

When the multi-head 1 moves in the seek operation in forward direction (right direction in FIG. 2) by ½ P (P is a track pitch), the head element H2 functions as a servo head, instead of the head element H1, and the head elements H5 and H7 function as data heads. Similarly, when the multi-head 1 shifts by ½ P in the forward direction, the servo head and the data heads shift to adjacent right head elements.

On the contrary, when the multi-head 1 moves in the reverse direction (left direction) by ½ P, the head element H8 functions as a servo head, instead of the head element H1, and the head elements H3 and H5 function as data heads. Similarly, when the multi-head 1 shifts by ½ P in the reverse direction (left direction), a servo head and the data heads shifts in the reverse direction, the ON-track heads shifts to adjacent left head elements. Therefore, when the multi-head 1 moves by 4 track pitches (4P), the head element (H1) and the head elements (H4 and H6) function again as a servo head and data heads, respectively. Therefore, the period of the reproducing condition of the multi-head 1 is 4P, which coincides with the period of a servo track.

Figure 3:
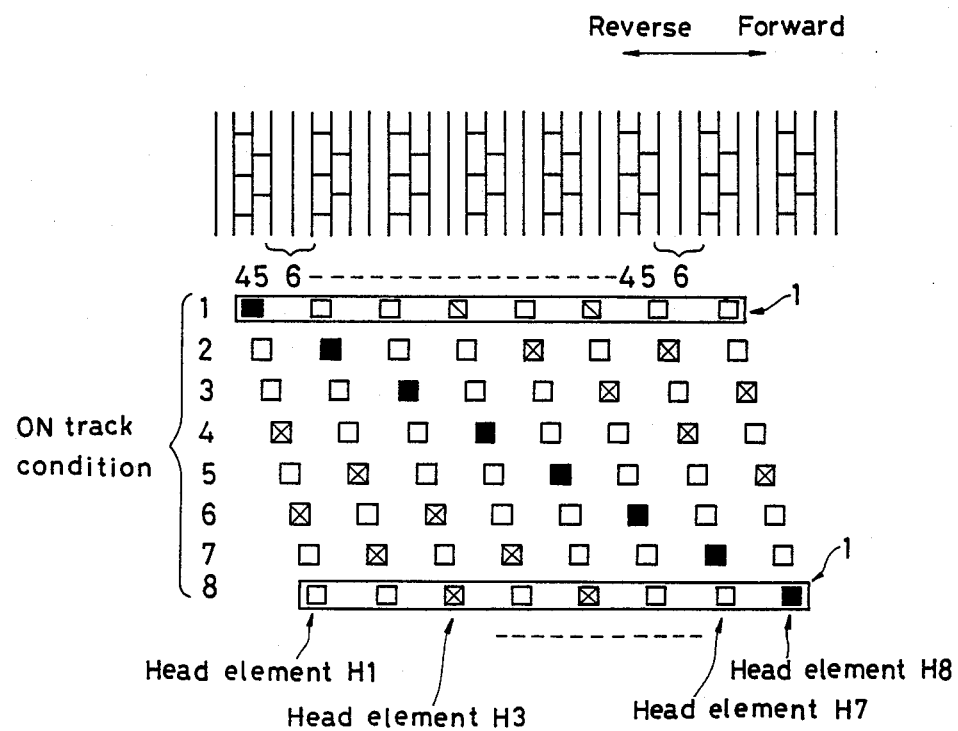
FIG. 3 shows the explanation of ON-track condition of a head in the embodiment of FIG. 2.

FIG. 3 shows the above operation. In the figure, the rectangular black symbol shows a head element which functions as a servo head, and a rectangular symbol with X shows a head element which functions as a data head. FIG. 3 clarifies the following matters.

(1) When a multi-head 1 moves by ½ P, a head element which functions as a servo head shifts to an adjacent head element.

(2) A multi-track 1 has eight ON track conditions in each period (4P) of a servo track.

(3) In each ON track condition, two head elements can function as data heads.

(4) A multi-head 1 can access all the data under the multi-head 1 in each period.

When two data tracks can be in ON-condition simultaneously the multi-head 1 may move in either direction when the particular data track is designated to seek. Therefore, the multi-head moves so that the moving length of the multi-head 1 is the shorter.

Therefore, a seek operation by an actuator which carries a multi-head is classified to a first short seek mode which moves by ½ P, and a second long seek mode which moves by a multiple of a period (4P).

Figure 4:
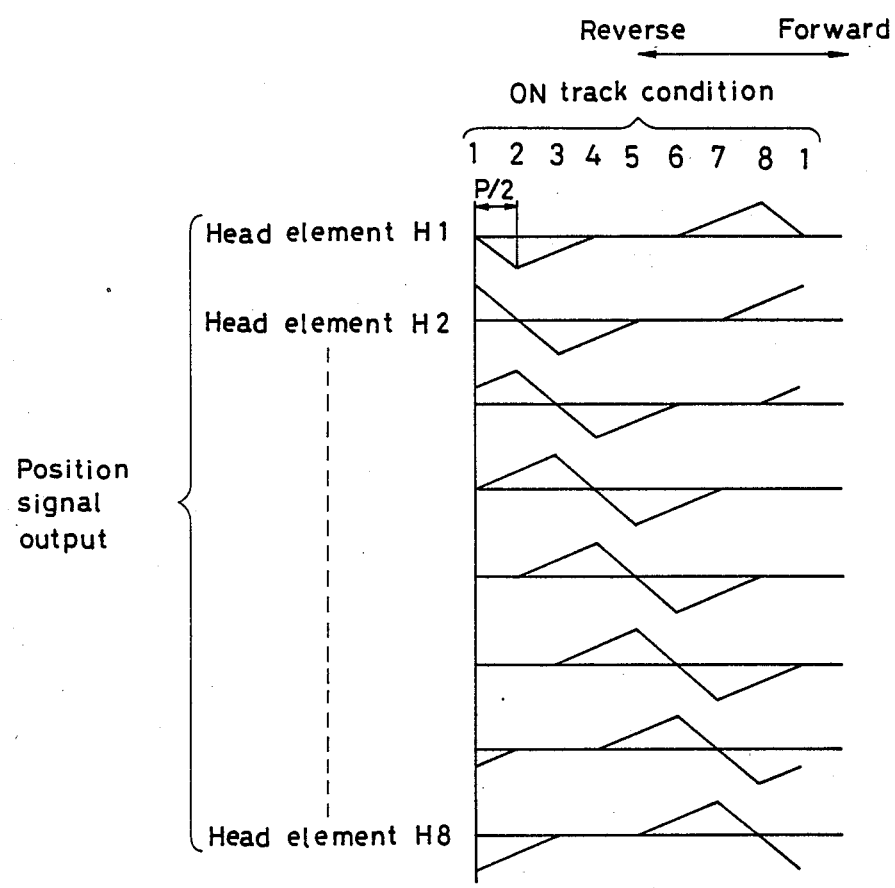
FIG. 4 shows waveforms of position signal in the embodiment of FIG. 2.

FIG. 4 shows waveforms of an output signal of each head element H1 through H8. In the figure, the vertical axis shows eight conditions in a period, and the horizontal axis shows the output signal of each head element. In the example of FIG. 2 (ON track condition 1), the head element H1 which functions as a servo head provides the output signal zero, the head elements H2 and H3 provide positive a output signal, and the head elements H7 and H8 provide negative output signals.

Next, when the multi-head shifts in the forward direction by ½ P (ON track condition 2), the head element H2, which provides the output signal zero, functions as a servo head. Similarly, as the multi-head shifts in the forward direction by ½ P, the number of a head element which is in ON track condition increases by one.

The waveforms of the head element H1 through H8 are the same as one another, and only the phase of each outputs differs from one another.

A servo head is selected in general as follows.

When a multi-head 1 moves in a forward direction, output of the current servo head (H1 in the embodiment of FIG. 2) is compared with an output of next head element (H2 in the embodiment of FIG. 2). If the latter is smaller than the former, the servo head is switched to the latter head element (H2).

On the other hand, when a multi-head 1 moves in a reverse direction, an output of a current servo head is compared with an output of a preceeding head element (H8). When the latter is smaller than the former, the latter head element is taken as a servo head.

In general, M number of outputs of head elements are compared with one another, and one of them is taken as a servo signal.

Figure 5:
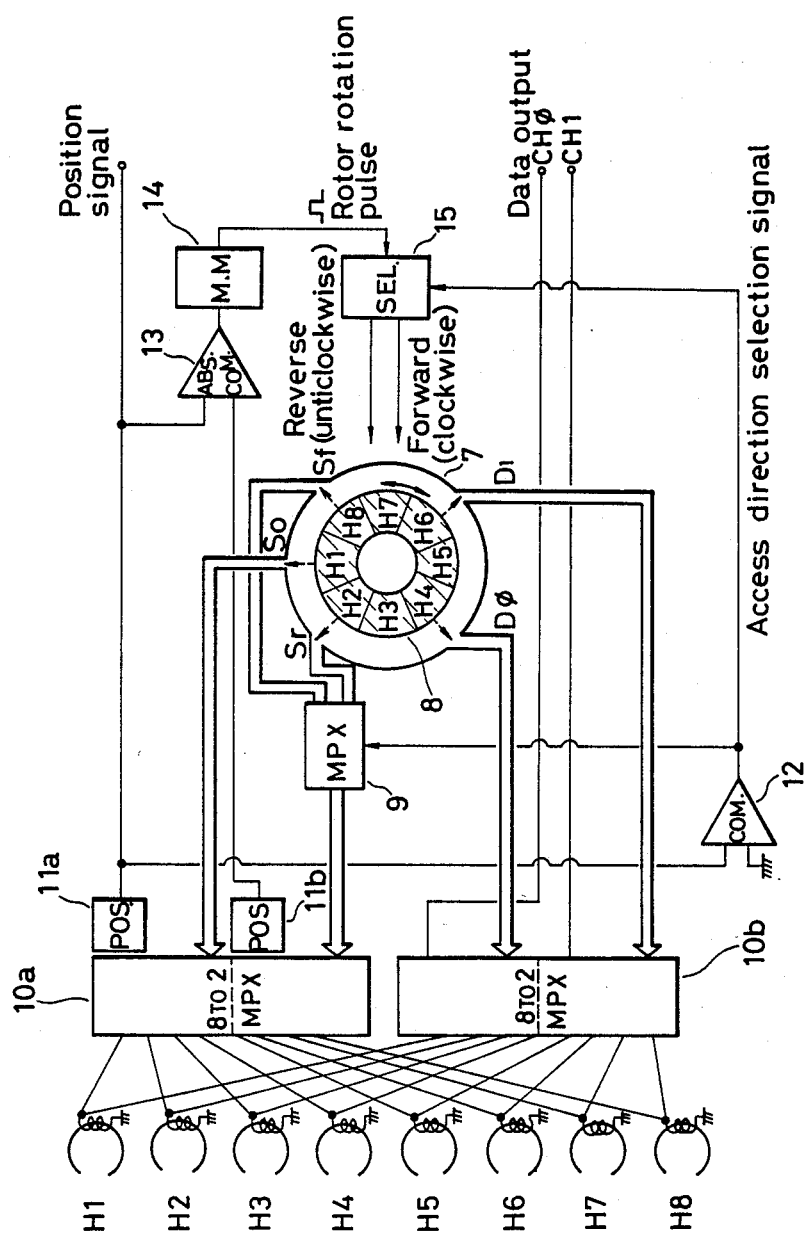
FIG. 5 is a block diagram of a head switching circuit in the embodiment of FIG. 2.

FIG. 5 shows a block diagram of an electrical circuit for switching a head element for a servo head. In the figure, the numeral 7 is a stator of a ring counter, 8 is a rotor of a ring counter. The stator 7 has an output port $S_O$ which designates a current head element which functions as a servo head, a second output port $S_f$ which designates a next head element for a servo head when the head moves in a forward direction, a third output port $S_r$ which designates a next head element for a servo head when the head moves in a reverse direction, and fourth output ports $D_0$ and $D_1$ which designate head elements for data heads. The rotor 8 stores a code of each of the head elements H1 through H8, and rotates according to the moving direction, and the moving length of the multi-head 1.

The numeral 9 is a multiplexer which selects a code of a head element which operates as a servo head in the next stage. The multiplexer 9 accepts the outputs of the output ports $S_f$ and $S_r$, and selects one of them according to the moving direction of the multi-head 1.

The numeral 10a is a multiplexer which selects a current servo element, and a head element which operates as a servo head in the next stage among the head elements H1 through H8. The numeral 10b is a multiplexer which designates two head elements which operate as data heads among the head elements H1 through H8.

The numerals 11a and 11b are position signal reproducing circuits which provide a position signal from the head elements selected by the multiplexer 10a. The circuit 11a provides the position signal by a current servo head, and the circuit 11b provides the position signal by a head element which operates as a servo head in the next stage. It should be appreciated of course that the position signal by the circuit 11a is output to an external circuit for head positioning, but the output signal of the circuit 11b is not provided to an external circuit.

The numeral 12 is a comparator which detects the moving direction of the multi-head 1. When the multi-head 1 moves in the forward direction, the head element which functions as a servo head provides a negative signal (see FIG. 4), which is applied to the comparator 12 through the position signal reproducing circuit 11a. Then, the comparator 12 provides the positive selection signal indicating that the moving direction is in forward direction. On the other hand, when the multi-head 1 moves in the reverse direction, the output of the position signal reproducing circuit 11a is positive, and the comparator 12 provides the negative selection signal. The selection signal by the comparator 12 is applied to the select terminal of the selector 15.

The numeral 13 is a comparator which compares the current position signal by the circuit 11a with the absolute value of the next position signal by the circuit 11b. The comparator 13 functions to switch the head element which operates as a servo head when the absolute value of the next head element becomes lower than the absolute value of the output of the current servo head.

Figure 6:
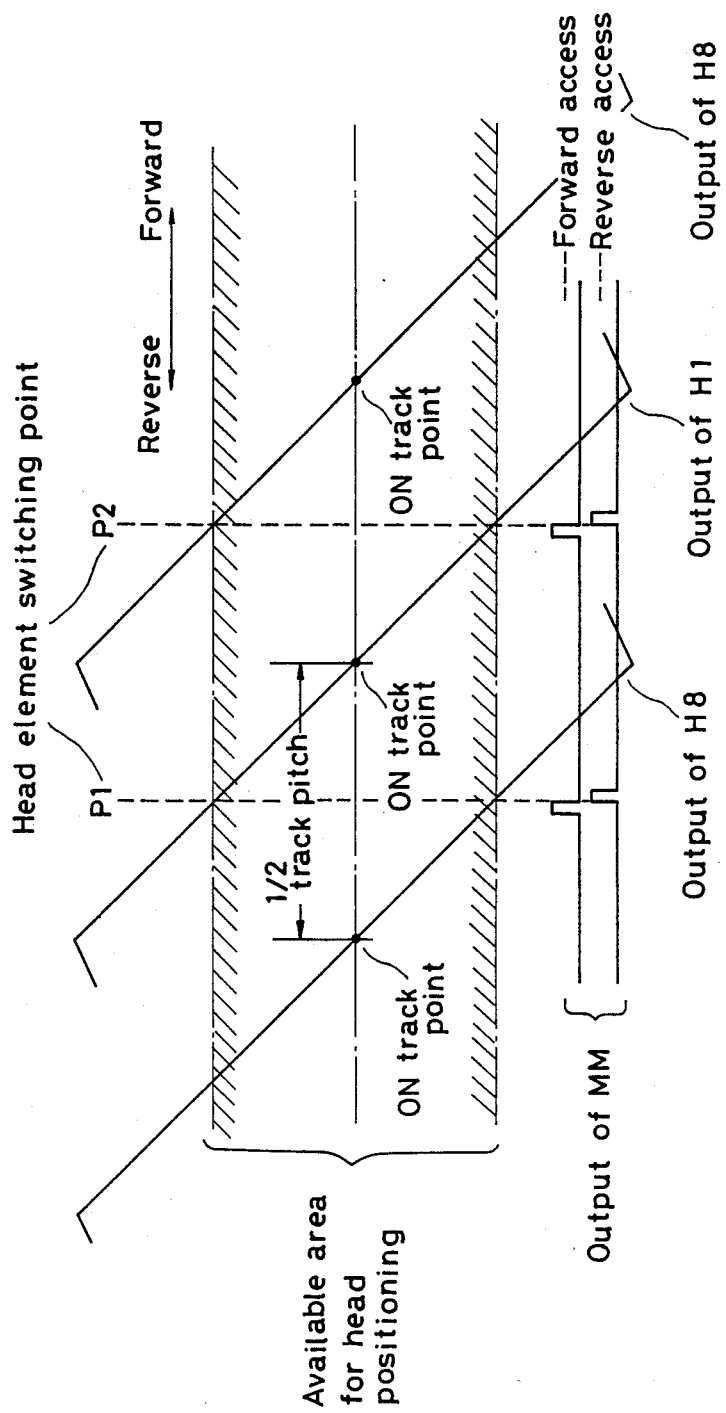
FIG. 6 shows explanation of switching of the position signal in the embodiment of FIG. 2.

As shown in FIG. 6, the comparator 13 detects the head element switching points p1, p2 . . . in which the absolute value of the position signals of the servo head becomes lower than the absolute value of the position signal of the next head element, and then, the comparator 13 triggers the single pulse generator 14. The single pulse generator 14 generates a single pulse which is applied to the input of the selector 15 as a rotor revolution pulse. The selector 15, then, provides an output signal either at a forward output terminal or a reverse output terminal according to the moving direction of the multi-head. Then, the rotor 8 rotates in the designated direction by one step so that the head element which operates as a servo head is selected and the output port $S_O$ of the stator 7 of the ring counter provides the code of the selected head element.

As described above in detail, a servo head and a pair of data heads are selected from among eight head elements H1 through H8 by using a simple circuit, and continuous servo signal is obtained. Each head elements H1 through H8 function as a servo head during the movement of ½ pitch. Although a prior art uses two-phase servo pattern which is read out by a single head and is separated into a two-phase signal by using an electrical circuit, the present embodiment uses a mono-phase servo pattern which is read out by using a pair of groups of head elements.

The particular effects of the first embodiment are enumerated as follows.

(1) a synchronization signal for separating a two-phase servo pattern by using an electrical circuit which is used in a prior art is unnecessary in the present invention. Therefore, the recording density of a servo pattern in the present invention is higher than that of a prior art. The present invention may use a servo pattern which has no synchronization signal, like a double-frequency pattern in which the frequency of each servo pattern differs from each other, and/or a di-bit pattern in which magnetic polarity of servo a pattern in each phase differs from each other. Thus, the highly accurate servo pattern is obtained following the tendency of high recording density of information data.

(2) The minimum moving length of a multi-head 1 is reduced to P/2, and therefore, the positioning accuracy is improved. In general, when an M-phase servo signal is reproduced, the minimum moving length of a multi-head is further reduced to P/M, and the positioning accuracy is further improved.

(3) A piezo-electric actuator which is suitable for short stroke access with high accuracy may be used in the present invention, by combining the same with another actuator which is used for coarse positioning for long stroke access. The use of a double positioning mechanism using two kinds of actuators improves the access capability.

Although the above embodiment assumes that the number of data tracks is 2 ($N_d=2$), the present invention is not restricted to that figure. When the period of servo tracks is $N_cP$, the number of servo pattern reproduced simultaneously is M, the number of head elements required for providing continuous servo pattern is K, and the number of head elements which are available to write and/or read simultaneously is $K_a$, the following equations are satisfied.

$$K = M \times N_c \quad (1)$$

$$K_a = N_c - N_s \quad (2)$$

Equation (1) is introduced by the fact that the condition of the multi-head after moving the total length $N_cP$ by the step P/M returns to the original condition. The equation (2) is introduced by the fact that the tracks except servo tracks are data tracks.

The space occupation ratio of recording medium by servo tracks is $N_s/N_c$. So, when two servo tracks are located with the period 20P (P is a track pitch), and two-phase servo signal is reproduced, then, $N_s+2$, $M=2$ and $N_c=20$ are satisfied, and therefore, the space occupation ratio by servo tracks is 10% when a multi-head with 40 head elements is used, in spite of number of recording disks.

As the phase number M of servo signal which are read out is usually between 2 and 4, when the period $N_c$ of the servo tracks increases, and the number K of the head elements increases, the equation (2) shows that the number $K_a$ of head elements which are operable simultaneously closes to 1/M of the total number of the head elements.

Figure 7:
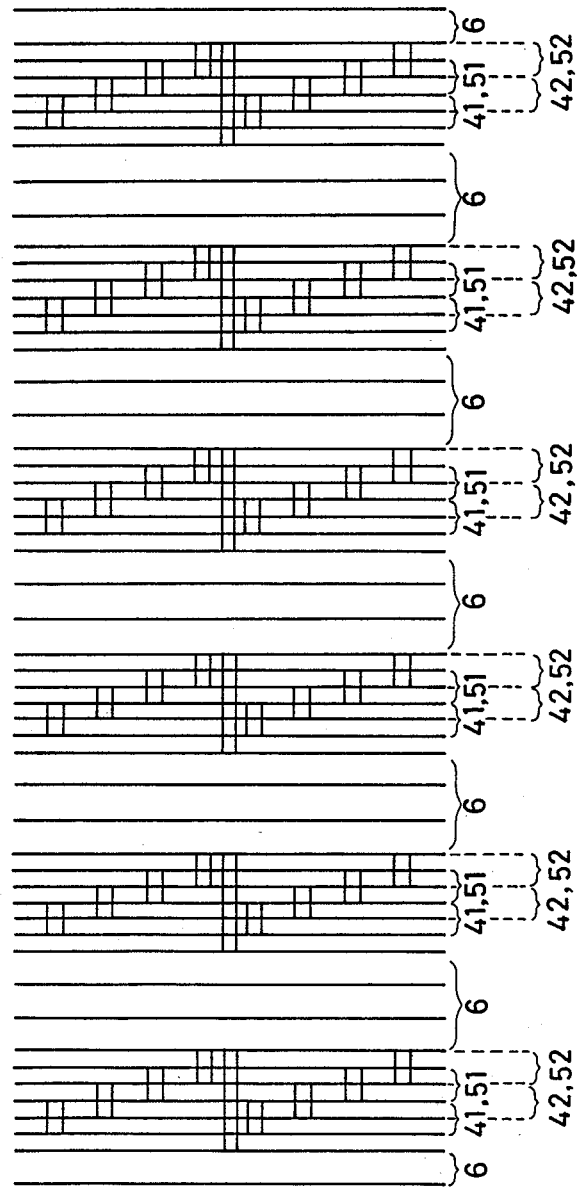
FIG. 7 shows the second embodiment in which a two phase servo system is used according to the present invention.

FIG. 7 shows the second embodiment of the present invention, and it concerns a two-phase servo system. In the embodiment of FIG. 7, it is assumed that number $N_d$ of data tracks is $N_d=3$, number $N_s$ of servo tracks is $N_s=3$, the head spacing constant $N_h$ is $N_h=5$, and number M of phases of servo signal is $M=2$.

In the figure, the number 1 is a multi-head having six head elements H1 through H6 each located with the period 5P. the multi-head 1 faces the recording medium, which has the ODD servo track of the primary phase 41, the EVEN servo track of the primary phase 51, the ODD servo track of the secondary phase 42, the EVEN servo track of the secondary phase 52, and a group of data tracks 6 which have three tracks.

The primary phase ODD servo track 41 and the primary phase EVEN servo track 51 are arranged similar to those of FIG. 2. The secondary ODD servo track 42 and the secondary EVEN servo track 52 overlap with halves of the primary ODD servo track 41 and the primary EVEN servo track 51, respectively, as shown in FIG. 7. Thus, the servo tracks have four servo patterns with the difference of P/2. A synchronization pattern SN is inserted between the servo tracks.

Figure 8:
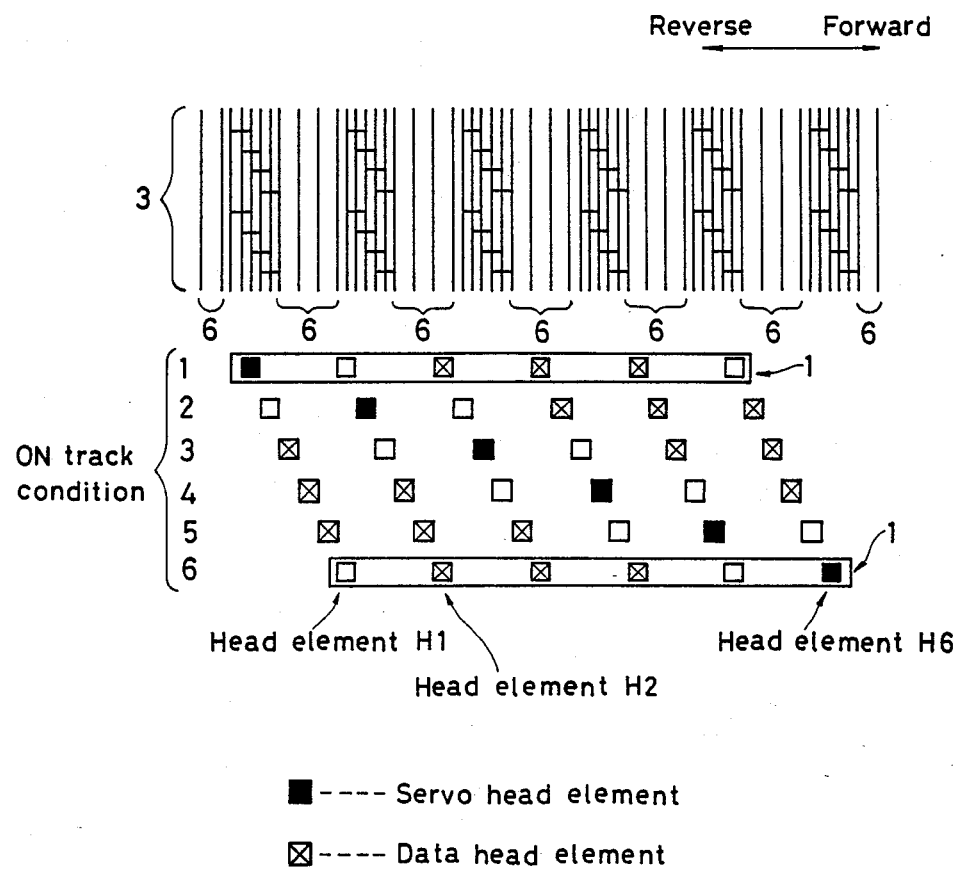
FIG. 8 shows the explanation of an ON-track condition of a head in the embodiment of FIG. 7.

FIG. 8 shows the ON track conditions in which the multi-head is stably positioned and is possible to write and/or read data in the embodiment of FIG. 7. In FIG. 8, the rectangular black symbol shows a head element which operates as a servo head, and a rectangular white symbol with an X letter shows a head element which operates as a data head. The following facts are understood in FIG. 8.

(1) In each period of a servo track, there are six ON track conditions in which it is possible to write and/or read data, with the interval of one track pitch.

(2) Three head elements can write and/or reach data simultaneously in each ON track condition.

(3) All the data tracks in five data areas can be accessed in each period of a servo track.

Figure 9:
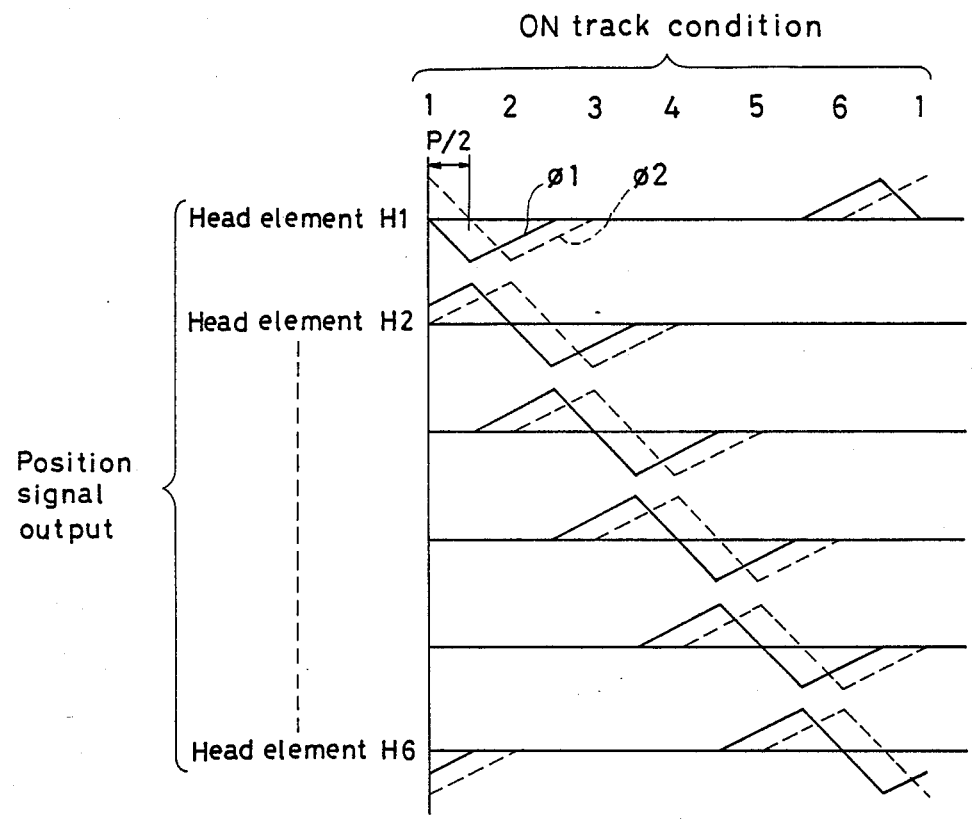
FIG. 9 shows waveforms of position signal in the embodiment of FIG.7.

FIG. 9 shows the output signal of each head element H1 through H6 in the present embodiment of FIG. 7. It should be noted in FIG. 9 that the primary phase position signal $\phi_1$ (solid line) reproduced by the head elements H1 through H6 is reproduced correctly during the whole track pitch P, and that the secondary phase position signal $\phi_2$ (dotted line) is also reproduced correctly during the whole track pitch P, at the position shifted by P/2.

Accordingly, the continuous position signal is obtained as is the case of the embodiment of FIG. 6, by comparing the two adjacent position signals, and switching the head elements H1 through H6 or the position signals $O_1$ and $\phi_2$ so that the smaller output signal is selected.

Figure 10:
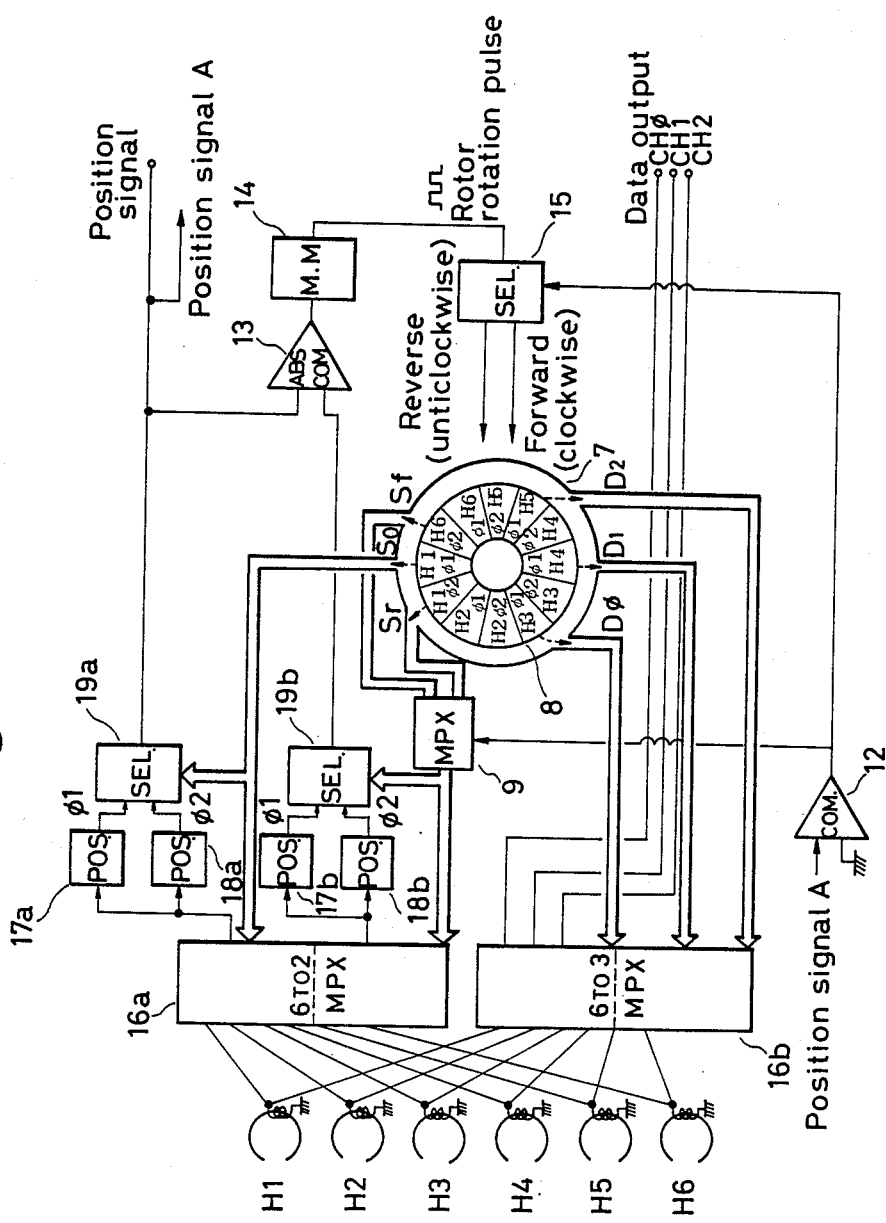
FIG. 10 is a block diagram of a head switching circuit in the embodiment of FIG. 7.

FIG. 10 is a block diagram of a switching circuit for effecting the above operation. In the figure, the numeral 16a is a multiplexer for selecting two head elements which operate as a servo head at a current stage and a next stage among six head elements H1 through H6.

The numeral 16b is a multiplexer for selecting three head elements which operate as data heads among six head elements H1 through H6.

The first output of the multiplexer 16a is applied to the position signal reproducing circuit 17a which provides the primary phase position signal $\phi_1$ of the head element which is a current servo head, and the other position signal reproducing circuit 18a which provides the secondary phase position signal $\phi_2$ of that head element. The second output of the multiplexer 16a is applied to the position signal reproducing circuit 17a which provides the primary phase position signal $\phi_1$ of the head element which operates as a servo head at the next stage, and the other position signal reproducing circuit 18b which provides the secondary phase position signal $\phi_2$ of that head element.

Figure 11:
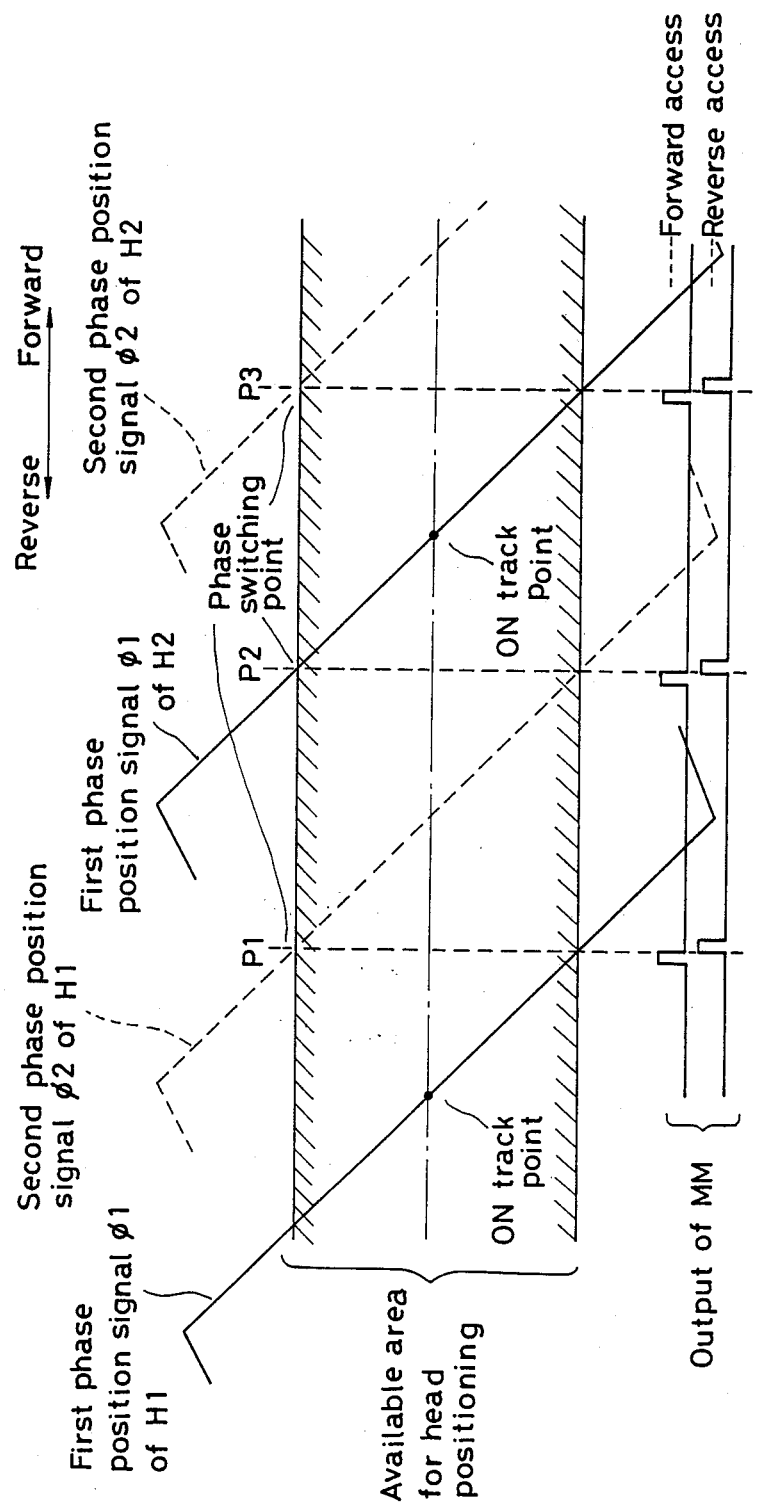
FIG. 11 shows explanation of switching of the position signal in the embodiment of FIG. 7.

Those position signal reproducing circuits 17a through 18b provide the position signals $\phi_1$ and $\phi_2$ of each phase as shown in FIGS. 9 and 11. The separation of the primary phase position signal $\phi_1$ and the secondary phase position signal $\phi_2$ is effected by using the synchronization pattern recorded on a servo track.

The position signals $\phi_1$ and $\phi_2$ from the position signal reproducing circuits 17a and 18a are applied to the selector 19a, which selects one of them. Similarly, the position signals $\phi_1$ and $\phi_2$ from the position signal reproducing circuits 17b and 18b are applied to the selector 19b, which selects one of them. The selection in selectors 19a and 19b are controlled by the code which is stored in the rotor 8 of the ring counter and is output from the output ports $S_O$, $S_f$ and $S_r$ on the stator 7. The rotor 8 has twelve codes according to the head elements H1 through H6, and the phases of the position signals, and each code is provided on the output port $S_O$, $S_f$ or $S_r$ of the stator 7, according to the revolution of the rotor 8.

The code of the current servo head and the phase from the output port $S_O$ is applied to the first select control terminal of the multiplexer 16a, and the select control terminal of the selector 19a. The code of the servo head and the phase at the next stage from the output ports $S_f$ and $S_r$ are applied to the multiplexer 9, which selects one of them according to the moving direction of the multi-head 1, and sends the selected one to the second select control terminal of the multiplexer 16a and the select control terminal of the selector 19b. As the result, the two selectors 19a and 19b provide the two adjacent phase position signals, and the comparison of the absolute values of those position signals provides the switching signal for the selection of the position signal.

FIG. 11 shows the operation of the switching. When the multi-head 1 moves in the forward direction, the rotor revolution pulse is provided at the position p1 where the absolute value of the primary phase position signal $\phi_1$ of the head element H1 becomes larger than the absolute value of the secondary phase position signal $\phi_2$ of the same head element H1. And, the secondary phase position signal $\phi_2$ is selected, instead of the primary phase position signal $\phi_1$. Similarly, the switching is carried out to the adjacent position signal at the position p2, p3. When the multi-head 1 moves in the reverse direction, the switching is carried out similarly.

The second embodiment using the two phases servo system has the advantage when compared with the single phase servo system that the number of the head elements is small as compared with that of the single phase system since each head reproduces a two phase servo pattern, although the head switching circuit of FIG. 10 is a little complicated when compared with that of FIG. 5.

FIG. 12 shows the third embodiment of the present invention. The feature of the third embodiment is that a servo pattern and a data are recorded on a recording medium with some azimuth. In FIG. 12, there are provided a servo track area 20 having the first azimuth, the servo track area 21 having the second azimuth, and data track area 22 having a plurality of tracks each having different azimuth alternately, in each period of servo track.

On the other hand, the multi-head 1 has a head element 201 having the first azimuth, and the head element 202 having the second azimuth, alternately. The spacing between the adjacent head elements in the embodiment of FIG. 12 is the same as that of the previous embodiments.

In the embodiment of FIG. 12, the writing operation, and/or the reading operation are possible only when the head element facing the track has the same azimuth as that of the track. Therefore, the crosstalk between tracks is reduced by the effect of the azimuth, and therefore, the recording density is increased, although the necessary number of the head elements is twice as large as that of the previous embodiments.

As described above in detail, according to the present invention, a multi-head has a plurality of spaced head elements, a servo track is arranged on a recording medium discretely, and the relation between the head spacing and the track pitch is designed in the relation of a sliding caliper. Therefore, the positioning of a head assembly without thermal off-track is obtained, and further, as the continuous position signal is obtained the high speed seek operation is possible.

It should be appreciated of course that some modification is possible to those skilled in the art. For instance, the present embodiments have assumed that a recording medium moves, but the present invention is applicable to a system in which a head moves.

From the foregoing, it will not be apparent that a new and improved positioning system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A head positioning system on a recording medium comprising:
   (a) a recording medium having a periodic arrangement of data tracks and servo tracks wherein the periodic arrangement having a predetermined period includes $N_d$ ($N_d$ is an integer equal to or larger than (1) number of data tracks and $N_s$ ($N_s$ is an integer equal to or larger than (2) number of servo tracks, said servo tracks having single phase servo patterns, alternately recorded thereon;
   (b) a multi-head carrying a plurality of head elements disposed in a direction perpendicular to the tracks, so that the distance between head elements is $(N_h + 1/M)P$ where $N_h$ is an integer equal to or larger than 0, M is an integer equal to or larger than 2, and P is a track pitch, said multi-head being movable in a direction generally perpendicular to the tracks;
   (c) means for selecting a servo head for reading servo tracks and a data head for reading data tracks from said head elements during a seek operation, wherein a selected servo head is selected to reproduce a servo pattern from a servo track and a selected data head is determined according to the selected servo head; and
   (d) wherein the multi-head is positioned on a servo track in every 1/M track pitch of movement.

2. A head positioning system according to claim 1, wherein:
   two adjacent data tracks have an opposite azimuth from each other;
   servo tracks in adjacent periods of the periodic arrangement having opposite azimuths with respect to one another; and
   each head element on the multi-head has alternately an opposite azimuth.

3. A head positioning system according to claim 1 further comprising means for determining a direction of movement of the head such that the moving distance of the head is the shortest when an object track is under the multi-head.

4. A head positioning system on a recording medium comprising:
   (a) a recording medium having periodic arrangement of data and servo track groups with a predetermined pitch period between tracks wherein a data track group had $N_d$ ($N_d$ is an integer equal to or larger than (1) number of data tracks, and a servo group has $N_s$ ($N_s$ is an integer equal to or larger than (2) number of servo tracks, each servo track having the same width and an M-phase servo pattern (M is an integer equal to or larger than 2), said data and servo track groups being disposed alternately on the recording medium;
   (b) a multi-head carrying a plurality of head elements equally spaced from one another and disposed in a direction perpendicular to the tracks, so that the distance between individual head elements is $N_h P$ where $N_h$ is an integer equal to or larger than 1 and P is a track pitch, and said multi-head is movable in a direction generally perpendicular to the direction of the tracks;
   (c) means for selecting a servo head for reading M-phase servo pattern on a servo track and a data head for reading a data track from among said head elements during a seek operation wherein a selected head is selected to reproduce a servo pattern on a servo track and a selected data head is determined according to the selected servo head; and
   (d) wherein the multi-head is positioned on a servo track in every 1/M track pitch of movement.

5. A head positioning system according to claim 4, further comprising means for determining a moving direction of the head such that the moving distance of the head is the shortest when an object track is under the multi-head.

* * * * *

UNITED STATES PATENT AND TRADEMARK OFFICE
CERTIFICATE OF CORRECTION

PATENT NO.   :   4,903,151

DATED        :   February 20, 1990

INVENTOR(S)  :   MIZUKAMI et al

It is certified that error appears in the above-identified patent and that said Letters Patent is hereby corrected as shown below:

On the cover page, Item [54], "SERVO TRASKS" should read --SERVO TRACKS--.

Column 1, line 4, "SERVO TRASKS" should read --SERVO TRACKS--.

Signed and Sealed this

Ninth Day of July, 1991

Attest:

HARRY F. MANBECK, JR.

Attesting Officer

Commissioner of Patents and Trademarks